(12) United States Patent
Hulse et al.

(10) Patent No.: US 9,003,455 B2
(45) Date of Patent: Apr. 7, 2015

(54) HOSPITALITY MEDIA SYSTEM EMPLOYING VIRTUAL SET TOP BOXES

(75) Inventors: David Hulse, Athens (GR); Thomas Duke, Edinburgh (GB)

(73) Assignee: Guest Tek Interactive Entertainment Ltd., Calgary (CA)

( * ) Notice: Subject to any disclaimer, the term of this patent is extended or adjusted under 35 U.S.C. 154(b) by 712 days.

(21) Appl. No.: 12/952,882

(22) Filed: Nov. 23, 2010

(65) Prior Publication Data

US 2012/0030706 A1    Feb. 2, 2012

Related U.S. Application Data

(60) Provisional application No. 61/369,550, filed on Jul. 30, 2010.

(51) Int. Cl.
| | |
|---|---|
| H04N 7/18 | (2006.01) |
| H04N 21/214 | (2011.01) |
| H04N 21/2665 | (2011.01) |
| H04N 21/4402 | (2011.01) |
| H04N 21/61 | (2011.01) |
| H04N 21/258 | (2011.01) |
| H04N 21/2343 | (2011.01) |
| H04N 21/431 | (2011.01) |
| H04N 21/436 | (2011.01) |
| H04N 21/482 | (2011.01) |

(52) U.S. Cl.
CPC ....... *H04N 21/2143* (2013.01); *H04N 21/2665* (2013.01); *H04N 21/440218* (2013.01); *H04N 21/6106* (2013.01); *H04N 21/25825* (2013.01); *H04N 21/234309* (2013.01); *H04N 21/431* (2013.01); *H04N 21/436* (2013.01); *H04N 21/43615* (2013.01); *H04N 21/482* (2013.01)

(58) Field of Classification Search
USPC .......................................................... 725/78
See application file for complete search history.

(56) References Cited

U.S. PATENT DOCUMENTS

| | | |
|---|---|---|
| 4,641,253 A | 2/1987 | Mastran |
| 5,319,455 A | 6/1994 | Hoarty |
| 5,412,720 A | 5/1995 | Hoarty |
| 5,442,700 A | 8/1995 | Snell et al. |
| 5,485,197 A | 1/1996 | Hoarty |
| 5,526,034 A | 6/1996 | Hoarty et al. |
| 5,550,578 A | 8/1996 | Hoarty et al. |
| 5,557,316 A | 9/1996 | Hoarty et al. |
| 5,587,734 A | 12/1996 | Lauder et al. |
| 5,594,507 A | 1/1997 | Hoarty |

(Continued)

FOREIGN PATENT DOCUMENTS

| | | |
|---|---|---|
| CN | 1687893 A | 10/2005 |
| CN | 1913943 A | 2/2007 |

(Continued)

OTHER PUBLICATIONS

U.S. Appl. No. 61/369,550, filed Jul. 30, 2010, Hulse.

(Continued)

*Primary Examiner* — Ricky Chin
(74) *Attorney, Agent, or Firm* — ATMAC Patent Services Ltd.; Andrew T. MacMillan (57) ABSTRACT

Methods and apparatus are described for providing digital content to televisions or other devices having media playback capabilities over a network infrastructure using virtual set top boxes (VSTBs).

28 Claims, 5 Drawing Sheets

(56) References Cited

U.S. PATENT DOCUMENTS

| | | | |
|---|---|---|---|
| 5,757,925 A | 5/1998 | Faybishenko |
| 5,812,665 A | 9/1998 | Hoarty et al. |
| 5,883,661 A | 3/1999 | Hoarty |
| 5,926,647 A | 7/1999 | Adams et al. |
| 6,034,678 A | 3/2000 | Hoarty et al. |
| 6,049,823 A | 4/2000 | Hwang |
| 6,055,315 A | 4/2000 | Doyle et al. |
| 6,064,377 A | 5/2000 | Hoarty et al. |
| 6,100,883 A | 8/2000 | Hoarty |
| 6,198,822 B1 | 3/2001 | Doyle et al. |
| 6,202,211 B1 | 3/2001 | Williams, Jr. |
| 6,205,582 B1 | 3/2001 | Hoarty |
| 6,253,238 B1 | 6/2001 | Lauder et al. |
| 6,263,346 B1 | 7/2001 | Rodriquez |
| 6,301,616 B1 | 10/2001 | Pal et al. |
| 6,305,020 B1 | 10/2001 | Hoarty et al. |
| 6,463,459 B1 | 10/2002 | Orr et al. |
| 6,571,245 B2 | 5/2003 | Chun et al. |
| 6,600,496 B1 | 7/2003 | Wagner et al. |
| 6,907,574 B2 | 6/2005 | Xu et al. |
| 6,941,382 B1 | 9/2005 | Tuli |
| 7,103,099 B1 | 9/2006 | Paz et al. |
| 7,254,786 B2 | 8/2007 | Henriquez |
| 7,589,737 B2 | 9/2009 | Hochmuth et al. |
| 7,600,239 B2 | 10/2009 | De Lange et al. |
| 7,747,086 B1 | 6/2010 | Hobbs et al. |
| 8,209,717 B2 * | 6/2012 | Pina ............................ 725/39 |
| 8,732,749 B2 | 5/2014 | Hulse et al. |
| 2002/0109712 A1 | 8/2002 | Yacovone et al. |
| 2003/0025722 A1 | 2/2003 | Cliff et al. |
| 2003/0234819 A1* | 12/2003 | Daly et al. ................... 345/810 |
| 2004/0024580 A1 | 2/2004 | Salmonsen et al. |
| 2004/0090597 A1 | 5/2004 | De Haan |
| 2005/0256923 A1 | 11/2005 | Adachi |
| 2006/0117371 A1 | 6/2006 | Margulis |
| 2006/0184614 A1 | 8/2006 | Baratto et al. |
| 2006/0195884 A1* | 8/2006 | van Zoest et al. .............. 725/134 |
| 2006/0206820 A1 | 9/2006 | Bullard et al. |
| 2006/0230105 A1 | 10/2006 | Shappir et al. |
| 2006/0230156 A1 | 10/2006 | Shappir et al. |
| 2007/0073730 A1 | 3/2007 | Jun |
| 2007/0266123 A1 | 11/2007 | Johannesson et al. |
| 2008/0007559 A1 | 1/2008 | Kalaiah et al. |
| 2008/0034029 A1 | 2/2008 | Fang et al. |
| 2008/0170619 A1 | 7/2008 | Landau |
| 2008/0170622 A1 | 7/2008 | Gordon et al. |
| 2008/0178249 A1 | 7/2008 | Gordon et al. |
| 2008/0186979 A1 | 8/2008 | Kolar |
| 2008/0201736 A1 | 8/2008 | Gordon et al. |
| 2008/0212942 A1 | 9/2008 | Gordon et al. |
| 2008/0215671 A1 | 9/2008 | Lu et al. |
| 2008/0228865 A1 | 9/2008 | Cruzada |
| 2009/0006537 A1 | 1/2009 | Palekar et al. |
| 2009/0041118 A1 | 2/2009 | Pavlovskaia et al. |
| 2009/0080523 A1 | 3/2009 | McDowell |
| 2009/0100125 A1 | 4/2009 | McDowell |
| 2009/0100483 A1 | 4/2009 | McDowell |
| 2009/0119365 A1 | 5/2009 | Tomic |
| 2009/0172751 A1 | 7/2009 | Aldrey et al. |
| 2009/0196346 A1 | 8/2009 | Zhang et al. |
| 2009/0210817 A1 | 8/2009 | Schmieder et al. |
| 2009/0313674 A1 | 12/2009 | Ludvig et al. |
| 2009/0316709 A1 | 12/2009 | Polcha |
| 2009/0328109 A1 | 12/2009 | Pavlovskaia et al. |
| 2010/0031347 A1 | 2/2010 | Ohto |
| 2010/0064335 A1 | 3/2010 | Jenkin et al. |
| 2010/0106766 A1 | 4/2010 | Bailey et al. |
| 2010/0111410 A1 | 5/2010 | Lu et al. |
| 2010/0118972 A1 | 5/2010 | Zhang et al. |
| 2010/0138476 A1 | 6/2010 | Gokaraju et al. |
| 2010/0158109 A1 | 6/2010 | Dahlby et al. |
| 2011/0126227 A1* | 5/2011 | Corvin ............................ 725/32 |
| 2011/0157196 A1 | 6/2011 | Nave et al. |
| 2011/0179106 A1 | 7/2011 | Hulse et al. |
| 2012/0030706 A1 | 2/2012 | Hulse et al. |
| 2014/0059597 A1* | 2/2014 | Issa et al. ........................ 725/36 |
| 2014/0250460 A1 | 9/2014 | Hulse et al. |

FOREIGN PATENT DOCUMENTS

| | | |
|---|---|---|
| CN | 101022398 A | 8/2007 |
| CN | 101083714 A | 12/2007 |
| EP | 1135722 A4 | 6/2005 |
| WO | 99/17549 A1 | 4/1999 |
| WO | 00/07091 A1 | 2/2000 |
| WO | WO 2008/088741 A2 | 7/2008 |
| WO | WO 2008/088772 | 7/2008 |
| WO | WO 2009/099895 | 8/2009 |
| WO | WO 2009/155214 | 12/2009 |
| WO | WO 2010/041267 | 4/2010 |
| WO | WO 2010/044926 | 4/2010 |
| WO | WO 2010/054136 | 5/2010 |

OTHER PUBLICATIONS

P.N. Tudor, et al., "Real-Time Transcoding of MPEG-2 Video Bit Streams", BBC R&D IBC (1997) Amsterdam.

R. Kurceren, et al., "Compressed Domain Video Editing,", ICASSP, IEEE, 2006.

PCT International Search Report and the Written Opinion of the International Searching Authority dated Feb. 21, 2012, International Application No. PCT/US011/044688.

Extended European search report including search opinion for corresponding app. 11812960.0 at EPO; Jan. 22, 2014.

International Search Report and Written Opinion of the International Searching Authority dated Apr. 30, 2010 (PCT/US2009/045996).

European Search Report and Opinion dated Apr. 21, 2011, EP Application No. 11150981.6.

T. Richardson, "The RFB Protocol", Version 3.3, pp. 1-26, retrieved from the Internet: URL: http://grox.net/doc/apps/vnc/rfbproto.pdf, dated Jan. 2998.

F. Lamberti, et al., "A Streaming-based Solution for Remote Visualization of 3d Graphics on Mobile Devices", IEEE Transactions on Visualization and Computer Graphics, vol. 13, No. 2, Mar./Apr. 2007.

F. Richardson, et al. "Virtual Network Computing", IEEE Internet Computing, IEEE Service Center, New York, New York, vol. 2, No. 1, Jan. 1, 1998.

Australian Office Action dated Feb. 15, 2012, AU Application No. 2011200152.

Australian Notice of Acceptance, Jun. 18, 2014, App No. 2009344302.

English translation of First Office Action and Search Report by State Intellectual Property Office, P.R. China, for app. No. 200980159934.7, Aug. 30, 2013.

Australian Office Action dated Feb. 21, 2014, AU Application No. 2011283037.

Office Action by SIPO dated Jul. 24, 2014 for Chinese Patent Application No. 200980159934.7 (Concise explanation of relevance attached).

\* cited by examiner

HOSPITALITY MEDIA SYSTEM EMPLOYING VIRTUAL SET TOP BOXES

RELATED APPLICATION DATA

The present application claims priority under 35 U.S.C. 119(e) to U.S. Provisional Patent Application No. 61/369,550 for VIRTUAL SET TOP BOX filed on Jul. 30, 2010, the entire disclosure of which is incorporated herein by reference for all purposes.

BACKGROUND OF THE INVENTION

The present invention relates to virtualization of hardware resources in a network environment and, in particular, to virtualization of set top boxes that deliver digital content streams to a wide variety of computing and media playback devices.

A conventional hardware set top box (STB) receives an encrypted digital content or media stream from a network (e.g., a cable, satellite, or IP-based network), decrypts the stream, decodes it to frames, and then formats those frames for transmission to and presentation on a connected television; typically over some sort of cable connection such as, for example, a standard coaxial cable or, more recently, a High-Definition Multimedia Interface (HDMI) cable. Most STBs employ a digital tuner to decode the media stream, although most televisions now include a digital tuner that performs at least some of this functionality. However, other functionalities of the STB have not typically been included in standard televisions due to lack of a single standard. For example, one of the primary reasons STBs were introduced was for the decryption of high-value content, something that could not be handled by the television. Once introduced for this purpose, other functionalities were implemented in the available platform such as, for example, advanced navigation user interfaces, and TV guide applications.

Systems which deliver digital content for display on televisions including, for example, cable, satellite, and IP-based television systems (as well as combinations of these), typically rely on the deployment of STBs with every television, representing an enormous portion of the capital costs associated with such systems.

SUMMARY OF THE INVENTION

According to the present invention, methods and apparatus are described for providing digital content to any of a variety of devices having media playback capabilities over a network infrastructure using virtual set top boxes (VSTBs).

According to one class of embodiments, systems and methods implemented in accordance with such embodiments provide video over a network. One or more servers are deployed on the network and configured to manage operation of a plurality of virtual set top boxes (VSTBs). Each VSTB corresponds to one of a plurality of VSTB clients on the network and is configured to combine a graphical user interface with one or more video streams. The one or more servers are further configured to transmit the combined graphical user interface and one or more video streams to the corresponding VSTB client as a single media stream having a frame format and codec supported by the corresponding VSTB client and an associated display. The one or more servers are further configured to receive user input from each VSTB client and provide the user input to the graphical user interface of the corresponding VSTB. At least some of the user input represents interaction of a user associated with each VSTB client with a representation of the graphical user interface.

According to specific embodiments, each of the plurality of VSTB clients is configured to receive the single media stream from the corresponding VSTB, to render the single media stream on the associated display, and to transmit the user input to the one or more servers.

According to another class of embodiments, computer-implemented methods for operating a virtual set top box (VSTB) in a network are provided. The VSTB is allocated to a VSTB client on the network. A graphical user interface is combined with one or more video streams into a single media stream. The single media stream is transmitted to the VSTB client using a frame format and codec supported by the VSTB client and the associated display. User input received from the VSTB client is provided to the graphical user interface. At least some of the user input represents interaction of a user associated with the VSTB client with a representation of the graphical user interface.

According to another class of embodiments, a control unit is provided that is configured for operation in a system for providing video over a network. The system includes one or more servers deployed on the network and configured to manage operation of a plurality of virtual set top boxes (VSTBs). Each VSTB is configured to combine a graphical user interface with one or more video streams. The one or more servers are further configured to transmit the combined graphical user interface and one or more video streams as a single media stream over the network. The control unit includes one or more first interfaces configured to receive the single media stream generated by a corresponding one of the VSTBs from the one or more servers, and to transmit user input over the network to the one or more servers. At least some of the user input represents interaction of a user with a representation of the graphical user interface. A second interface is configured to transmit the single media stream to a playback device having an associated display for rendering on the display. The control unit also includes processing resources for communicating with the playback device and the one or more servers.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Various embodiments of the present invention employ virtual set top boxes (VSTBs) that virtualize some or all of the functionalities associated with a conventional set top box (STB), thereby removing the requirement for deployment of expensive and complicated devices for each television or display device in a digital content delivery system. By virtualizing or redistributing functionality typically associated with conventional set top boxes to other components within the overall system architecture, the cost of the conventional STB can be eliminated.

Additionally, various embodiments of the invention may be characterized by various advantages. For example, according to specific embodiments, a VSTB instance is allocated on a one-to-one basis to the television or other device associated with each requesting user. As such, a VSTB instance is only required for each television (or other display, computing, or media playback device) that is actively being used. This is to be contrasted with conventional STBs, which are required to be present with every television whether the television is being used or not.

Furthermore, a physical STB is generally only capable of processing at most 1 or 2 input media streams due to the limitations of the STB hardware. A VSTB, on the other hand, executes as a software process on a server with multiple CPU cores providing many times more processing power. Therefore, a VSTB may make use of this extra processing power to perform tasks that a conventional STB simply cannot, and was never designed to do. For example, a VSTB may be able to process several input media streams simultaneously, arranging them into a grid or mosaic pattern, and scaling them into variable-sized windows for advanced picture-in-picture functionality.

A further advantage to the use of VSTBs in accordance with embodiments of the invention is the ability to speed up the time it takes to change channels. Some conventional STBs are generally limited to a fixed lower bound of around 2 seconds on channel change time, determined by the specific media decoder chips used in the construction of the STB. In a VSTB, the media decoding pipeline may be optimized such that channel changes can take place in considerably less time (much less than one second in some cases). According to a specific embodiment, this ability is enabled, at least in part, by the fact that the media streams are consolidated by the VSTB instances at the back end rather than transmitted as individual streams that flow over the network to a remote conventional hardware STB.

In addition, due to the greater processing power of a server environment, it is possible for a VSTB to pre-process the input media streams that it receives during a given session so that the playback of a series of separate media streams appears to the viewer like a single seamless media stream, much like a conventional television broadcast. This is to be contrasted with the playback of the same series of media streams on a conventional STB, which would typically involve short delays during which the STB changes from one media stream to the next. To the viewer, these delays appear as black interludes, in which the media content disappears for a few seconds and then returns with the start of the next stream.

Moreover, given the ability of some VSTB implementations to seamlessly splice a series of media streams into a single continuous stream as previously described, it is possible to insert arbitrary media clips within a series of media streams, or to replace a portion of one media stream with another media clip. This has important applications in the area of live broadcast television streams, in which it may be desirable to replace generic advertisements in the incoming stream with localized advertisements, perhaps more specifically targeted to the viewer. This type of application is something that a conventional STB typically cannot manage due to a lack of sufficient processing power to perform the necessary splicing and playback operations in real time.

Various embodiments of the present invention rely to different degrees on the digital tuning capabilities available in many standard televisions today. Some embodiments are implemented to avoid having to introduce a client device or incorporate client software at the television. According to some of these embodiments, a VSTB instance at the server side generates a media stream (which may include either or both of audio and video components) that can be decoded by a standard digital tuner in the associated television. However, as will be described, embodiments are also contemplated in which relatively simple devices and/or software clients are deployed with corresponding televisions to promote compatibility with a wide variety of television types and capabilities. In such cases, the generated media stream flows through the deployed device or software client where it is appropriately processed and then transmitted to the associated television or playback device.

It should also be noted that, while embodiments of the invention are described with reference to televisions as the device to which media streams are ultimately provided, embodiments of the invention are contemplated in which the output of a VSTB may be provided to a wide range of media and computing devices such as, for example, desktop and laptop computers, netbooks, notebook and tablet devices (e.g., iPads), handheld devices (e.g., smart phones like the iPhone and Droid), and any other type of device having media presentation or playback capabilities. In addition, embodiments of the invention are contemplated that employ a variety of network infrastructures to deliver VSTB output to such devices. Such infrastructures include IP-based networks (both wired and wireless), cable and satellite television networks, telecommunications networks, and various combinations thereof. The scope of the present invention should therefore not be limited to the specific embodiments described herein.

Figure 1:
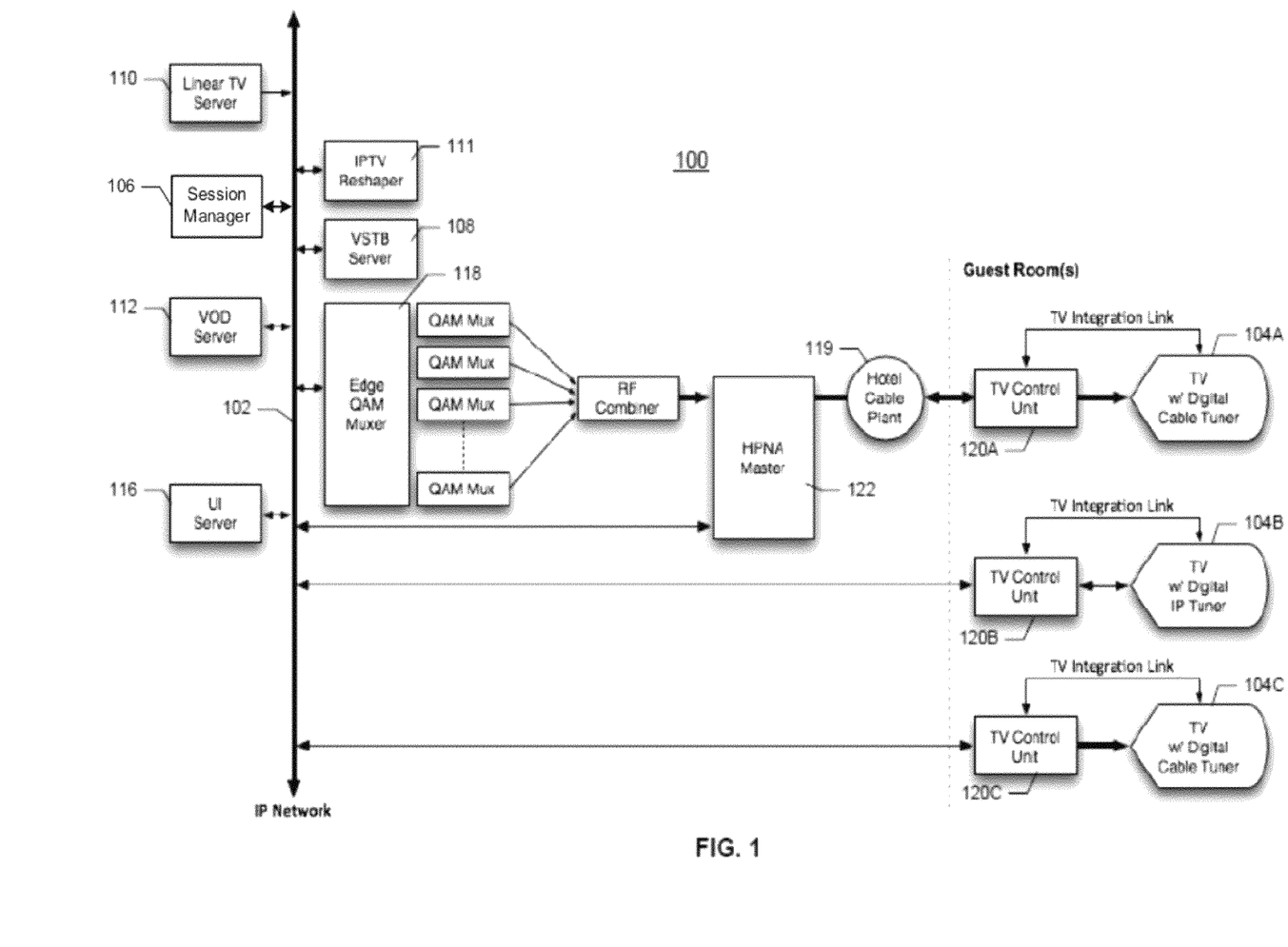
FIG. 1 is a simplified block diagram of a digital content delivery system designed in accordance with various embodiments of the invention.

FIG. 1 is a block level diagram of a system architecture of a digital content delivery system 100 implemented according to one or more specific embodiments of the present invention. As will become clear, embodiments of the invention may be implemented in the context of both wired and wireless IP-based networks (e.g., using standard Ethernet or fiber-optic cable), coaxial cable networks (as exist in many hotels and as employed by cable providers), telecommunications networks (e.g., 3G or 4G networks), or hybrid combinations of such technologies. At least some of this diversity is represented in FIG. 1 by the different paths between back end IP network 102 and in-room televisions 104. It should be understood that the diagram of FIG. 1 represents embodiments that employ IP-based or cable infrastructures, as well as embodiments that employ both.

In this example, a hybrid infrastructure is deployed in a hotel property, and provides a variety of services including digital television and video-on-demand (VOD) (in both standard and high definition, SD and HD), Internet access, and a variety of other guest services including, for example, remote checkout, wake up calls, room service, etc. However, as mentioned above, it should be noted that this is merely one example of a context in which such an infrastructure might be implemented in accordance with the invention. Other implementation contexts as well as a broad range of services and service sets are contemplated to be within the scope of the invention.

VSTB server 108 (which may be one or more servers) typically has multiple VSTB instances running at any given time, each of which delivers content to an active television or other media playback device to which the VSTB instance has been allocated. Each VSTB instance is intended to provide a user experience similar to that of a physical STB and therefore also generates interactive menus blended with or overlaid on the content stream. The manner in which these functions are achieved in accordance with specific implementations is described below with reference to FIG. 3. As mentioned above, the number of VSTB instances running need only correspond to the number of active televisions rather than the total number of televisions in the system (as required with conventional in-room STBs). This may represent significant efficiencies in the cost and maintenance of hardware resources since it is typical for 40% or more of the televisions to be inactive at any given time.

Linear TV Server 110 (typically an array of servers) receives digital television channel broadcasts from any of a variety of sources (e.g., European DVB-C signals, U.S. proprietary satellite signals, etc.) and converts each channel into an IP-based media stream that is transmitted on IP Network 102 for consumption by active VSTB instances as required. Linear TV Server 110 may encrypt the output streams, or leave intact the encryption originally applied by the content provider/broadcaster.

According to various embodiments, Linear TV Server 110 outputs a number of IPTV streams, possibly encrypted, using a variety of different codecs and frame sizes. For example, live broadcast TV is commonly encoded using the H.264 or MPEG-2 standards and may be standard definition (SD) or high definition (HD) video. On the other hand, a given VSTB instance will generate a video stream targeting a specific device such as a guest television, laptop, or smart phone. The particular device will have a certain screen size and will only be able to process input streams using certain supported codecs. That is, the VSTB generates a continuous output stream that the target device will tune to initially. Thereafter, the output stream will provide the interactive menus and content to the target device without the device needing to retune to any other stream. If this stream being consumed by the target device were to contain periodic changes in frame size and/or compression codec, the result may at best appear unsightly to the user from an aesthetic perspective, and at worst may not be processed correctly by the target device resulting in a device malfunction as live broadcast streams typically do not exhibit such changes and target devices may not have been adequately tested to handle these cases.

Therefore, the corresponding VSTB instance will be configured to generate its output to match the target device's screen size and to use a codec supported by the target device. Consequently, any video streams used as input to the VSTB instance will need to be converted to match the target screen size and output codec. Embodiments of the invention are contemplated in which the VSTB instance (or a separate functionality on VSTB Server 108 or elsewhere) performs this input stream conversion. However, because the input streams are a common network resource, it may be more efficient in some implementations to have the streams pre-processed appropriately before they are consumed by a given VSTB.

According to a particular class of embodiments, stream pre-processing is handled by IPTV Reshaper 111 (which may be one or more servers), which is designed to process a number of streams in parallel. IPTV Reshaper 111 consumes the streams output from Linear TV Server 110 and converts each stream to a standard format using a specified codec and frame size. Stream conversion of this nature is commonly referred to as "transcoding" and generally involves the following steps. First, the input stream is decrypted if necessary. The input stream is then demultiplexed and decoded into a sequence of uncompressed video frames and audio samples using suitable input codecs. The uncompressed video frames are scaled to the size required for the output stream. The uncompressed video frames and audio samples are encoded using suitable output codecs, and the sub-streams are multiplexed using a suitable container format, such as an MPEG-2 Transport Stream. The output stream may then be encrypted if desired.

As an example, consider an input stream encoded using MPEG-2 using a video frame size of 640×480. Such a stream would be decoded to a sequence of YUV formatted video frames of size 640×480 pixels and a sequence of PCM formatted audio samples. Any other sub-streams containing information such as subtitles or private data are not decoded and are simply passed through to the output. Consider then that the video frames are scaled to a high definition size of 1280×768 ready for output. These scaled frames and the uncompressed audio samples are then encoded using an H.264 codec for the video and an AC3 codec for the audio. All of the sub-streams are then multiplexed into an MPEG-2 transport stream for output. It should be noted that any of a wide variety of suitable video transport stream protocols and mechanisms may be employed without departing from the present invention.

An often-cited problem with video transcoding processes is a so-called generational loss of quality, wherein the lossy nature of the codecs involved can result in the loss of additional information when the stream is re-encoded, thereby visibly degrading the picture quality. With a certain amount of care during the decoding and encoding steps, this loss can be avoided in certain cases by recording information concerning the level of quantization of each macroblock and other relevant parameters that affect the level of lossiness. When it is time to re-encode the stream, the recorded parameters may be useful in determining how to encode each output macroblock without inducing additional loss. The effectiveness of this technique depends on how much scaling is involved during the transcoding and on the similarity of input and output codecs. More information on this technique may be found in Real-Time Transcoding of MPEG-2 Video Bit Streams by P. N. Tudor and O. H. Werner BBC R&D—IBC'97, Amsterdam, the entirety of which is incorporated herein by reference for all purposes.

VOD Server 112 (again typically an array of servers) hosts "on demand" video content (e.g., feature films) and makes this content available for transmission to the VSTBs allocated to requesting users. VOD Server 112 enables video control functionality such as play, pause, fast-forward, rewind, skip-forward, skip-back, etc. Examples of VOD servers that may be employed with systems implemented according to specific embodiments are provided by BitBand Technologies Ltd. of Netanya, Israel. In contrast with the media streams provided by Linear TV Server 110, the media content streams provided by VOD Server 112 are pre-encoded to have a standard frame size and codec. Additionally, as with the linear TV media streams, this content may be pre-encrypted as required, for example, by the content owner.

As may be appreciated with reference to the foregoing description, IPTV Reshaper 111 and VOD Server 112 collectively generate a set of (optionally encrypted) digital media streams that share a common frame size, codec, and encryption scheme. These streams are made available for consumption on IP Network 102 by any VSTB instance operating on VSTB Server 108 that may so require. According to various embodiments, these streams are not intended for consumption by any other part of the system, including the televisions or media playback devices. Thus, the only way for a stream to be viewed on a playback device in the system is for the stream to pass as input to a VSTB instance allocated to that device. It should be noted, however, that although some embodiments are described in terms of common codecs and frame sizes and assuming homogeneous target devices, other embodiments are contemplated that serve a heterogeneous mix of target devices (e.g., any type of television, computing device, telecommunications device, and/or any other type of media playback device). That is, according to some embodiments, the various components of the content subsystem are configured to support such a heterogeneous mix of target devices by suitably pre-shaping content and making it available on the IP network for consumption by the VSTB instances. Therefore reference to specific embodiments in which the codecs and frame sizes are common and/or a homogeneous set of target devices is being served should not be used to limit the scope of the invention.

According to a specific class of embodiments, UI Server 116 (which may be multiple servers) provides virtual user interfaces (VUIs) to the VSTB instances on VSTB Server 108. Such VUIs may include, for example, interactive menus or guides for navigating and selecting content and service options available in the system. For these embodiments, there is a one-to-one correspondence between VUI and VSTB instances such that whenever a new VSTB instance is created, a corresponding VUI instance is also created. Each VSTB instance will acquire a series of UI frames depicting its corresponding virtual user interface and overlay them on the media stream it is generating as described below with reference to FIG. 3.

According to specific embodiments, these virtual user interfaces are made accessible to VSTB instances via Virtual Network Computing (VNC) sessions using VNC clients that are part of the VSTB instances. UI Server 116 provides a VNC server hosting each VUI instance allowing each VSTB instance to connect using its internal VNC client. According to more specific embodiments, each VUI instance runs an Adobe Flash player that renders the VUI in response to user inputs received from elsewhere in the network.

According to a more specific embodiment, the VNC client within each VSTB instance connects to the VUI server only to receive the graphical updates to its corresponding VUI instance. This VNC client does not provide any user input to the VUI because such user input is not available to the VSTB. Instead, a second input-only VNC client is used to provide the user input events necessary to successfully operate the virtual user interface. These input-only VNC clients, specific to each VUI instance, are part of Session Manager Server 106, described below. Thus, a given VUI instance on UI Server 116 will export its user interface via a VNC Server and two separate VNC client connections will be used, the first supplying the graphical representation of the VUI to the corresponding VSTB instance, and the second supplying the user input events that drive the user interface.

According to some embodiments, UI Server 116 may be implemented in a manner similar to the virtual UI server described in U.S. patent application Ser. No. 12/688,343 for VIRTUAL USER INTERFACE filed on Jan. 15, 2010, the entire disclosure of which is incorporated herein by reference for all purposes.

A Session Manager Server 106 (which may be multiple servers) receives user input data representing user interaction with the televisions, computing devices, or media playback devices (either from the device, or via TV control units, e.g., 120A-C, as described below) and provides the data to the corresponding VUI instance on UI Server 116. As outlined above, user input arriving from a given television or other media playback device is collated by Session Manager Server 106 and forwarded to the corresponding VUI instance on UI Server 116 using a VNC client connection. This connection is special in that no graphical updates are requested from the VNC server as would usually be the case. Instead, only input events are forwarded to the VUI instance. This effectively separates the graphical updates from the user input and allows the processing of these aspects to take place on different servers within the system.

According to some embodiments, Session Manager Server 106 is also tasked with the responsibility of managing the various resources allocated to each active user. For example, when a user's television is switched on, the Session Manager responds by coordinating the allocation of resources on other servers such as VSTB Server 108, UI Server 116, and possibly Edge QAM Muxer 118 if the television is connected via a coaxial cable infrastructure. When the user's session is complete, the Session Manager responds by releasing any resources allocated during the session. In this manner, Session Manager Server 106 performs the role of resource coordination and is therefore central to the operation of the system and the interconnection and interoperation of its various constituent parts.

According to embodiments in which at least part of the network infrastructure employs coaxial cable, Edge QAM Muxer 118 operates as a media converter that retransmits digital media streams received from the IP domain (e.g., IP Network 102) using Quadrature Amplitude Modulation (QAM) in the coax domain (e.g., Hotel Cable Plant 119). According to a specific implementation, Edge QAM Muxer 118 operates on a Linux platform and converts multiple MPEG-2 (SD or HD) or H.264 (SD or HD) Single Program Transport Streams received via IP (IPTV) to several Multiple Program Transport Streams that are transmitted via coax according to the DVB-C standard using any of a variety of QAM modulation schemes, e.g., 64-QAM, 256-QAM, etc. It should be noted that other modulation schemes (e.g., quadrature phase shift keying (QPSK)) and standards, (e.g., the Digital Video Broadcasting—Terrestrial (DVB-T) standard, Advanced Television Systems Committee (ATSC) standards, etc.) may alternatively be employed. According to some embodiments, Edge QAM Muxer may be implemented as described in U.S. patent application Ser. No. 12/463,993 for COAX AND IP HYBRID DIGITAL TV AND VOD SYSTEM filed on May 11, 2009, the entire disclosure of which is incorporated herein by reference for all purposes. It should be noted that, according to some embodiments, for each television connected via coaxial cabling, Session Manager 106 will allocate a dedicated slice of bandwidth within a Multiple Program Transport Stream output from Edge QAM Muxer 118 for transmission of the media stream generated by the VSTB instance allocated to the television.

The preceding descriptions have outlined embodiments whereby a VSTB instance, with the aid of other associated resources, generates a media stream intended for direct consumption by a specific target television or other media playback device. This generated stream is formed by compositing zero or more input media streams representing broadcast linear TV or VOD content and a graphical user interface layer. The composition of these input elements results in a single output media stream providing the entire interactive experience for a user. Thus, the television need simply tune to this generated stream when it is first activated at the start of the user's session. Thereafter, the generated stream will continue to reflect the user's choices as the interactive TV system is used. If the user wishes to view a different linear TV channel or VOD asset, the inputs to the VSTB instance will change and the generated stream will reflect these changes. However, the television does not need to retune to a different stream at any time while the user's session is active. It should also be noted that the generated stream will be supplied to the target television either via Edge QAM Muxer 118 or as a direct IPTV stream, depending on the types of inputs the television is equipped to handle. For example, many televisions will accept a digital coaxial input, whereas other televisions may be able to receive IPTV inputs directly.

Figure 2A:
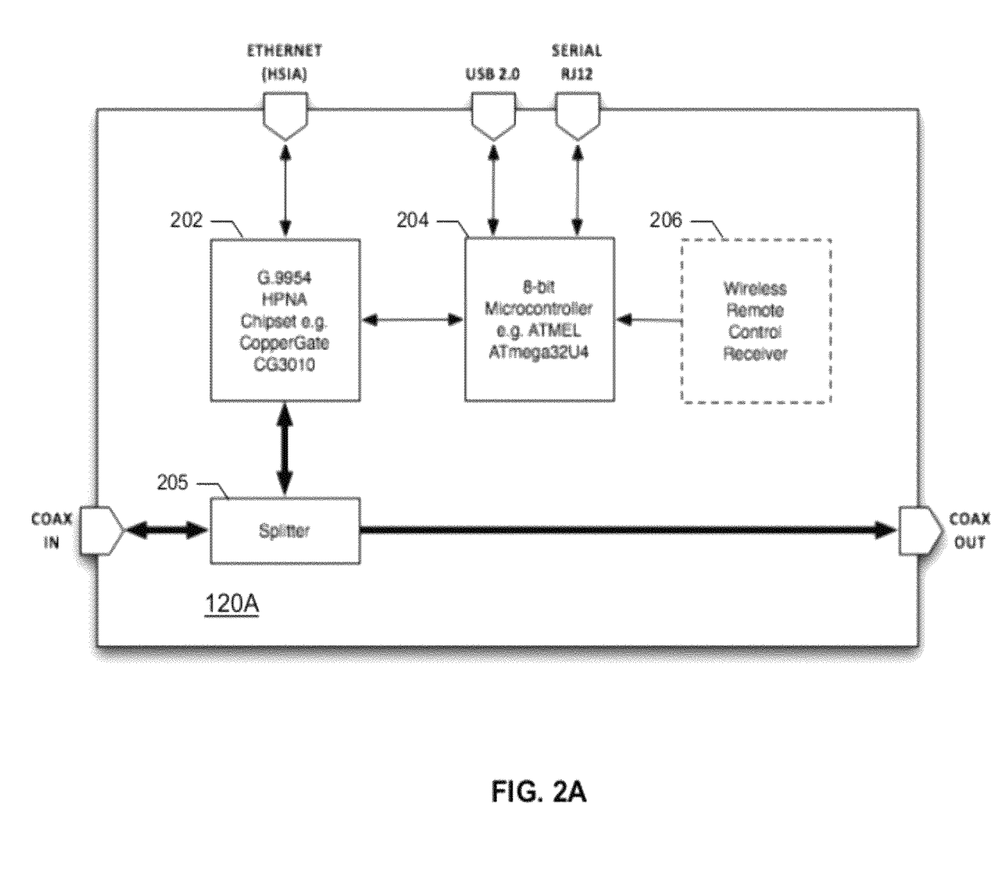
FIGS. 2A-2C are simplified block diagrams of TV Control Units for use with various embodiments of the invention.

Although not required for all embodiments, various embodiments of the invention may include TV Control Units (e.g., 120A-C) associated with the televisions (e.g., 104A-C) that generally do not include the kind of media processing capabilities typical of a conventional STB. Examples of such TV Control Units are shown in the block diagrams of FIGS. 2A-2C. According to some of these embodiments, the TV Control Unit may provide a communication facility so that the servers on the other side of the network can control devices attached to the unit remotely using, for example, IP as a protocol. In the case of an Ethernet network, the communication facility may include an Ethernet switch chip, which receives the Ethernet communications coming into the room from the network. See, for example, Ethernet Switch Chips 222 and 242 of FIGS. 2B and 2C. In the case of a coaxial network, the communication facility may be, for example, an IP-over-coax mechanism such as, for example, the HPNA standard (formerly the Home Phoneline Networking Alliance). See, for example, HPNA Chipset 202 of FIG. 2A. The user may connect his own computing device, e.g., laptop or other computing device, to the network via these resources and the available Ethernet (HSIA) connectors.

USB 2.0 ports are also provided with some embodiments for connecting various types of guest devices for a variety of purposes including, for example, charging the devices, or interfacing the devices with the system in some way. For example, a guest device might be a camera which, when connected to the system, might upload its pictures to the system for viewing on the connected television. In another example, a user might connect a memory device (e.g., a USB drive) which, when connected to the system, would make the files stored on the drive available on the system. In yet another example, a user might connect a music player (e.g., a iPod or similar device) which, when connected to the system, would make the user's music files available for playback on the system. Any of a variety of other examples will be apparent to those of skill in the art.

Each TV Control Unit includes processing resources (e.g., a microcontroller with firmware) for managing the operation of the unit, and running any necessary protocols for communicating with any connected resource or device, e.g., interacting with the remote servers (e.g., via an intervening communication facility), receiving and responding to IP-based commands, as well as inputs from the television or other connected resources, etc. See, for example, Microcontrollers 204, 224, and 244 of FIGS. 2A-2C. According to specific embodiments, these processing resources run a serial protocol to communicate with and control the television (e.g., via the RJ12 ports shown in each of the figures) as required during the operation of the system (e.g., to turn the television on or off, tune to a particular channel, etc.).

For embodiments implemented in coaxial cable networks, a portion of the RF spectrum present on the cable is used for bi-directional transmission of IP data packets (e.g., HPNA data), while another portion of the spectrum is used for uni-directional transmission of digital content towards the television. In such embodiments, the TV Control Unit includes a splitting mechanism (e.g., Splitter 205 of FIG. 2A) with associated filters on each of the output paths (not shown), which separate the IP data from the digital media data. IP data is interpreted by the microcontroller firmware, while digital media data is passed through to the digital tuner in the television.

Figure 2B:
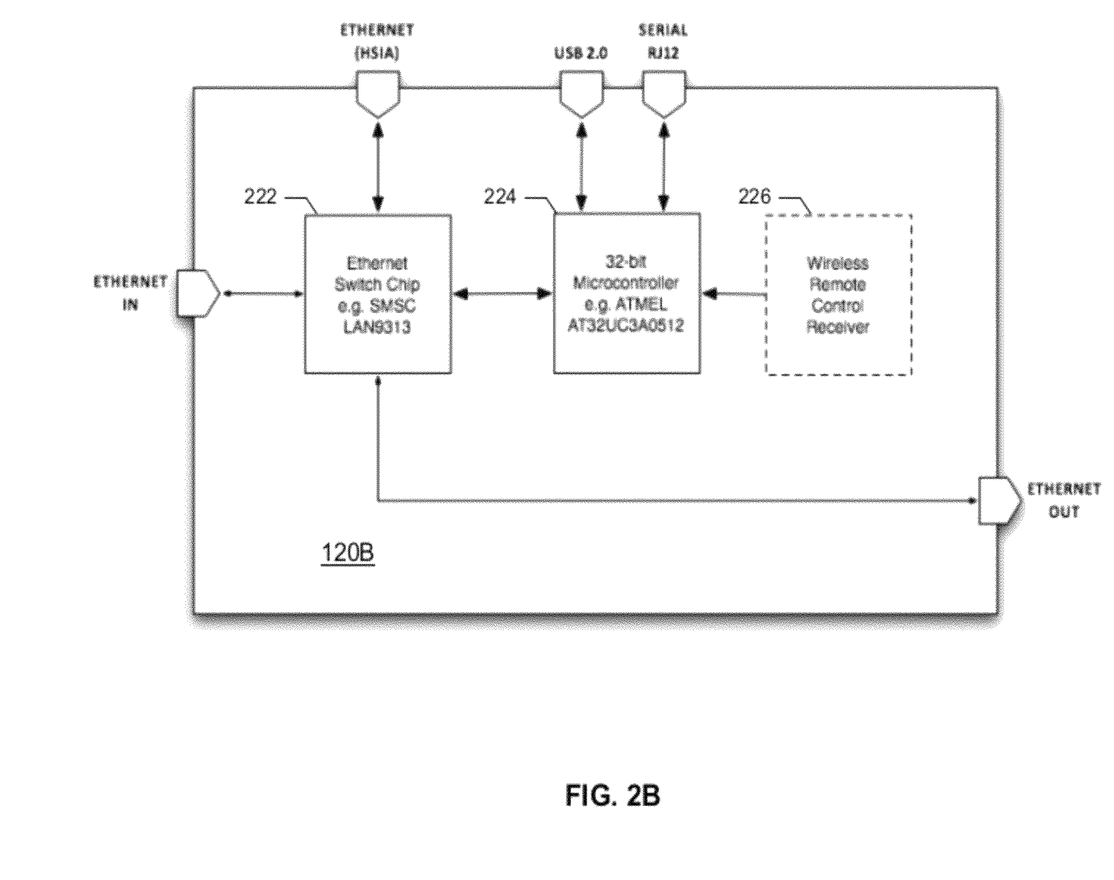
Figure 2C:
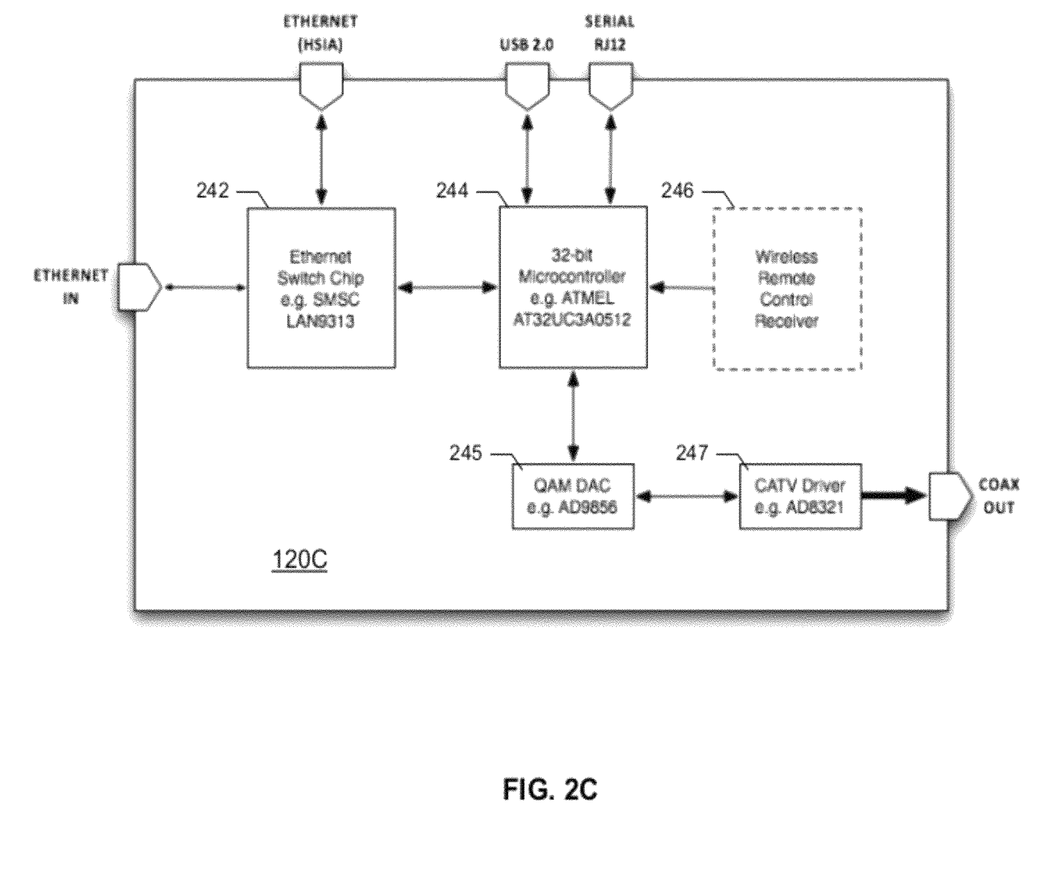

For Ethernet embodiments (e.g., FIGS. 2B and 2C), the TV Control Unit receives only IP data packets including both control data and content packets containing the digital media data. The TV Control Unit recognizes which packets are which and processes them accordingly. If the television includes an IP input capability, the content packets may simply be passed through to the television (as shown in FIG. 2B). If not, the TV Control Unit may convert these packets from Ethernet to a coaxial cable format (e.g., via QAM DAC 245 and CATV Driver 247 of FIG. 2C) such that the output may be directly consumed by a television input port.

According to some embodiments, a standard infrared remote control is provided for the user to interact with the television. The commands from the remote control are received by the television and are transmitted to the TV Control Unit using the television's infrared pass-through mechanism, typically via the serial interface to the TV Control Unit. According to other embodiments, the TV Control Unit includes a Wireless Remote Control Receiver (e.g., receivers 206, 226, and 246 of FIGS. 2A-2C) so that a non-directional control device (e.g., an RF control device) may be employed to interact with the system. Additionally, and according to specific embodiments, the RF receivers in the TV Control Units may work in conjunction with one or more additional wireless RF devices including, for example, a keyboard, a mouse or other cursor control device, etc., to enable such devices to interact with the system.

Generally speaking, the TV Control Unit receives user input from control devices as described above and, depending on the nature of the input, may use it to either control the television, provide appropriate information to the back end servers, or both. For example, if the user presses the "Power On" button on the remote control, upon receiving this input event the TV Control Unit commands the television to turn on, and alerts Session Manager server 106 of the event so that a VSTB instance and other resources may be instantiated and allocated to the television that was just turned on. In another example, if the user presses the "Up" arrow on his remote control, this event may be simply forwarded to the Session Manager server so that a corresponding update in the virtual user interface with which the user is interacting may be effected. Ultimately, the video stream being generated by the associated VSTB will reflect the updates and the result of the user's actions will be visible on the corresponding television. The manner in which this is accomplished is described in greater detail below.

Various implementations of the TV Control Units enable a single overall system solution that can work with a variety of different televisions with different built-in capabilities, as well as different network infrastructures; it is simply a matter of deploying the appropriate TV Control Unit for each specific situation. Alternatively, televisions that have sufficient built-in capabilities in combination with a specific network type (e.g., IP-based or coaxial cable) may obviate the need for the TV Control Unit in some embodiments, either partially or entirely. For embodiments without the TV Control Unit, commands received from in-room control devices (whether a remote control, keyboard, mouse, or other device) may be transmitted to Session Manager server 106 directly via the television's built in IP connection (e.g., an Ethernet port).

Figure 3:
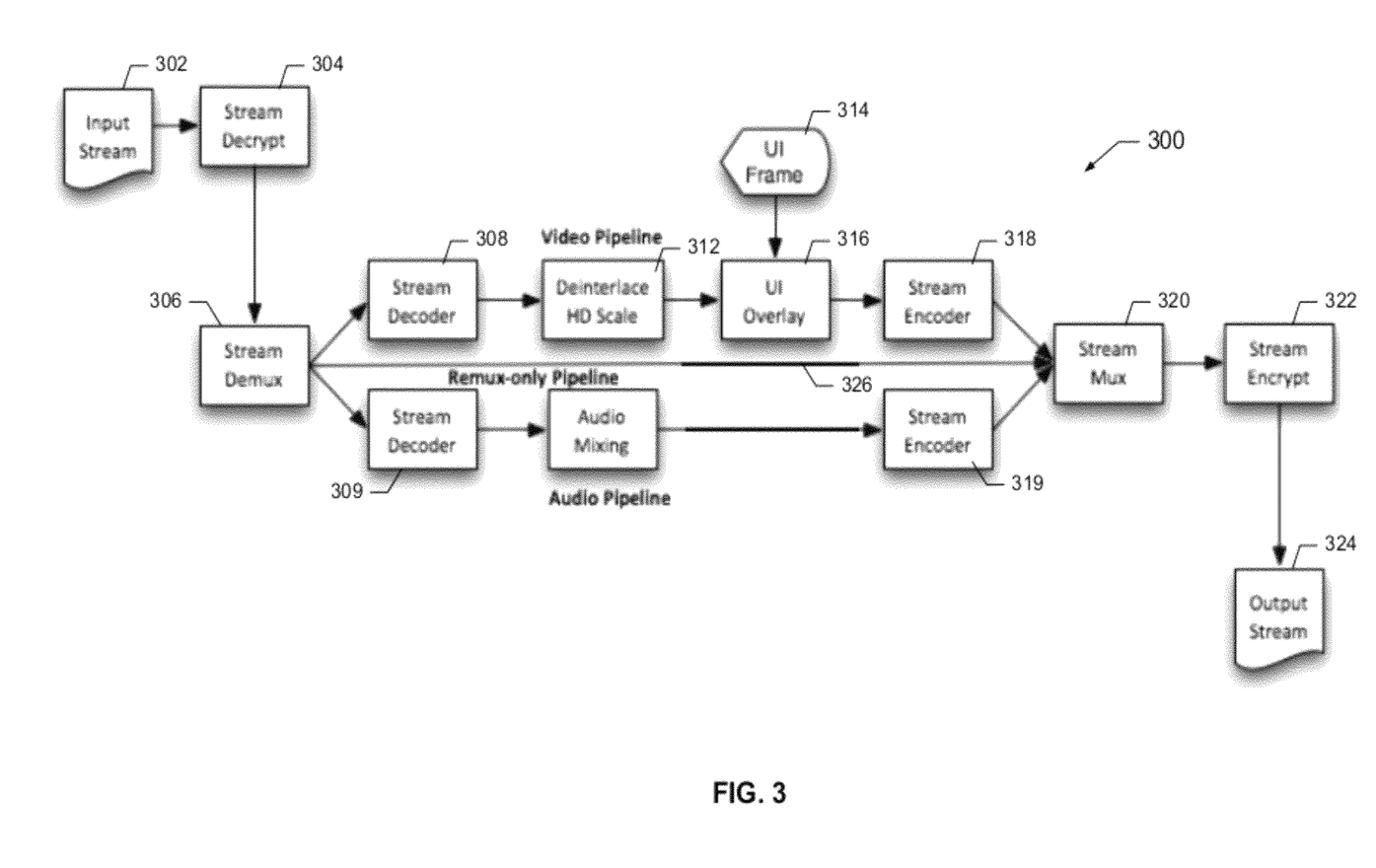
FIG. 3 is a simplified block diagram representing the functionality of a virtual set top box (VSTB) according to various specific embodiments of the invention.

FIG. 3 is a block diagram representing the basic operation of a software implementation of an instance of a VSTB according to a specific embodiment of the invention. According to various embodiments of the invention, the core functionalities of a conventional hardware STB are replicated either in the VSTB instance or elsewhere in the overall system architecture, e.g., in support servers (e.g., the IPTV Reshaper), in control units associated with the playback devices, in the playback devices, etc. The embodiment illustrated in FIG. 3 shows several such functionalities as being replicated in the VSTB instance. However, as described above, at least some of these functionalities may be offloaded to other resources to reduce the computational load on the VSTB Server. As such, the scope of the invention should not be limited with reference to this figure or its description.

Referring now to FIG. 3, VSTB instance 300 receives an input stream 302 (e.g., a digital media stream) from one or more of the servers in the system (e.g., Linear TV Server 110, VOD Server 112, or IPTV Reshaper 111) over a network (e.g., IP Network 102), and decrypts (304), demultiplexes (306), and decodes (308 and 309) the stream to sequences of raw video frames (e.g., YUV frames) and audio frames, which it then shapes for output to the television to which it has been allocated. This may involve, for example, deinterlacing and scaling (312) to the appropriate frame size. As mentioned above and according to some embodiments, the use of pre-encoded VOD content from the VOD Server and pre-shaped linear TV content output from the IPTV Reshaper can offload much of this computational burden from the VSTB instance. It should also be noted that one input stream is shown in FIG. 3 for explanatory purposes, but in reality, there could be several input streams all being processed in parallel according to the steps shown in FIG. 3. The decoded streams would then be composited along with the UI Frames (314).

A graphical user interface (GUI) 314 may be overlaid or composited with the decoded and processed video stream (316). This may involve pixel-by-pixel blending to achieve a partially or semi-transparent interface over the underlying video. It may also involve scaling the video to appear within a window in the UI layer. The compositing step may also involve multiple video streams as mentioned above. The decoded audio frames may also undergo mixing with other audio sources (e.g., sounds emitted during interaction with the GUI overlay). The resulting video and audio frames are then re-encoded (318, 319), re-multiplexed (320), encrypted (e.g., using a digital rights management (DRM) mechanism compatible with the associated television) (322), and transmitted as output stream 324 over the intervening network infrastructure to the corresponding television or other playback device for display.

At various times, the UI may not be visible (e.g., because the user is watching a linear TV channel and does not require a visible UI). At such times, the overlay/compositing step 316 may be skipped, either partially or entirely. Under these circumstances, the VSTB may have no need to decode the audio and video sub-streams and can pass the demultiplexed sub-streams via Remux-only Pipeline 326 instead of via the respective decoding pipelines (308-318). The Remux-only Pipeline simply remultiplexes the input sub-streams to the output stream, which requires much less computational power. On the other hand, if the UI is visible and/or requires compositing, the Remux-only Pipeline is not used because the input stream must be decoded to raw video frames to facilitate the overlay/compositing steps.

A conventional in-room STB would typically transmit its output to the connected television in an uncompressed format via, for example, an HDMI link. However, because the VSTB is not in the room with the television, this is not an option. Instead, according to various embodiments of the invention, the output stream generated by the VSTB is transmitted to the television over the network as an encrypted unicast MPEG-2 transport stream. That is, since the generated output stream may contain high value content, it may be necessary to encrypt the output stream for transmission over the intervening network to the television to protect the high value content from piracy. When a conventional STB is used, this step would typically be done using HDCP over the HDMI link to the television. However, a different solution is required when a VSTB architecture is used. More specifically, if encryption is necessary, according to a specific implementation, the television may be required to support a suitable Digital Rights Management (DRM) mechanism internally so that a stream encrypted using that mechanism can be consumed and decrypted directly by the television. For example, a common DRM mechanism in the hospitality context is Pro:Idiom® DRM System, a technology that can be licensed from Zenith Electronics LLC of Lincolnshire, Ill. Whatever the supported DRM mechanism, the output stream generated by a given VSTB instance is encrypted according to that mechanism before transmission over the intervening network.

Referring back to FIG. 1, the unicast output stream is transported by the back end IP Network 102 for subsequent transmission to the corresponding television over the balance of the network infrastructure. This may be, for example, a coaxial cable infrastructure (e.g., Hotel Cable Plant 119), in which case the video stream is provided to Edge QAM Muxer 118. Alternatively, the video stream may remain in the IP domain (wired or wireless) if the playback device or television (or the associated TV Control Unit) is connected to the IP network infrastructure.

Referring again to FIG. 3, UI Frame 314 is effectively a client of the UI server in which an image of the GUI at any given time is built up (e.g., UI Server 116). When UI Frame 314 has GUI frames that include non-transparent pixels, this information is injected into the video processing pipeline for overlay/compositing with the video frames.

According to various embodiments, once a VSTB instance is created and allocated it must continuously generate and encrypt its output video stream for presentation on the playback device to which it is allocated. Initially, and at other times when there may be no input stream or graphical user interface available, black video frames are substituted and these are effectively used to composite with an empty graphical frame buffer layer, resulting in a black composited frame. Otherwise, the display of the playback device would appear as if no input was being provided, e.g., a "No Signal" screen on a television.

According to various embodiments, the architectural components of a VSTB are configured with minimal buffering to avoid unintended latency effects that are perceptible to the user. That is, it is desirable to avoid the situation in which the user is able to perceive any delay in interacting with the GUI on the television relative to the conventional, in-room STB experience. Therefore, embodiments of the invention are implemented to ensure that large amounts of data do not need to be buffered before the data are processed. That is, buffering large amounts of data leads to an injection of latency while the buffer fills up and directly translates to noticeable delay in interactions with the GUI. In addition, it is desirable to provide sufficient computing power to be able to generate, process, and transmit video frames at a sufficiently high rate, e.g., 25 or 30 frames per second. According to specific embodiments, the parallel processing capabilities of servers with multiple processing cores enables the processing of consecutive video frames to overlap in time to more efficiently meet these constraints, and to be able to run a sufficient number of VSTBs per server to make this approach economically viable.

According to various embodiments, other functions conventionally handled by hardware STBs are replicated by various system components. According to a specific embodiment, specific functions are handled in the following manner.

Receiving and processing input events generated by remote controls, keyboards, mice, or other such user input devices is performed by the firmware of a TV Control Unit or directly by the TV in conjunction with a Session Manager server.

Communicating with various servers to control the transmission and reception of the input media stream(s) is performed by the VSTB software instance.

Communication with the TV to control basic functionality, such as volume level and power status is performed by the firmware of a TV Control Unit, typically using a serial communications interface to the TV, although other forms of control connection are possible. In some cases, TVs can be directly connected to an IP network for control purposes and in such cases, this functionality may be performed directly by the TV (i.e., control messages sent by other system components are directly received by the TV over an IP connection) and a TV Control Unit may not be required.

Interfacing with other connected devices such as user laptop computers, USB devices, etc., is performed by the firmware of a TV Control Unit, which provides direct control over the connected devices. These devices may then be made accessible to other system components through a suitable network protocol.

Communication with various servers to facilitate control over the STB and any connected devices including the TV is performed by the firmware of a TV Control Unit in conjunction with the communications hardware provided in the unit (e.g. an HPNA modem or Ethernet switch). A suitable protocol is defined allowing other system components to control the behavior of the TV Control Unit and any connected devices including the TV. This protocol may also allow the TV Control Unit to inform other system components of the occurrence of various asynchronous events such as the reception of user input, or the connection of a new device, or a change in the power status of a television.

The compositing of UI pixels with the decoded video stream, then re-encoding the composite video, can be computationally intensive. Therefore, according to some embodiments, this compositing may be performed directly on the encoded video stream using compressed domain video editing techniques such as, for example, the techniques described in Compressed Domain Video Editing, Ragip Kurceren and Fehmi Chebil, ICASSP 2006 (IEEE ©2006), the entire disclosure of which is incorporated herein by reference for all purposes. This would avoid the need for full encoding and decoding.

While the invention has been particularly shown and described with reference to specific embodiments thereof, it will be understood by those skilled in the art that changes in the form and details of the disclosed embodiments may be made without departing from the spirit or scope of the invention. For example, functionalities described herein may be implemented using computer program instructions stored in physical memory, e.g., any type of RAM, ROM, or other computer-readable storage media, associated with or accessible to the particular computing devices performing the described functions. Any of the various computing and programming tools and languages known to those of skill in the art which may be adapted for such purposes are within the scope of the present invention. Alternatively, at least some of the described functionality may be implemented using other types of hardware such as, for example, programmable logic devices, field-programmable gate arrays, application-specific integrated circuits, and the like. Again, suitable alternatives will be apparent to those of skill in the art.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A hospitality media system for providing video over a network, the system comprising:
one or more servers deployed on the network and configured to manage operation of a plurality of virtual set top boxes (VSTBs) and virtual user interfaces (VUIs);
one or more media servers deployed on the network and configured to make available to the VSTBs a plurality of digital video streams via the network; and
a plurality of display devices coupled to the network and located in guest rooms of a hospitality establishment;
wherein the display devices cannot directly access and playback the digital video streams from the media servers;
the one or more servers are configured to receive an alert via the network upon a user activating a display device at a start of a user session;
the one or more servers are configured to allocate resources in order to instantiate both a VSTB and a VUI for the display device in response to receiving the alert, the VSTB connecting to the VUI via a first virtual network computing (VNC) connection in order to receive graphical updates representing a graphical user interface as generated by the VUI, the VSTB further combining the graphical user interface with one or more of the digital video streams received from the media servers;
the one or more servers are further configured to transmit the combined graphical user interface and the one or more video streams from the VSTB to the display device as a single media stream having a frame format and codec supported by the display device;
the one or more servers are further configured to receive user input and provide the user input to the VUI via a second VNC connection, at least some of the user input representing interaction of the user with a representation of the graphical user interface as shown on the display device;
the one or more servers are further configured to send updates of the graphical user interface as driven by the user input from the VUI to the VSTB via the first VNC connection;
the one or more servers are further configured to change video stream inputs to the VSTB such that the VSTB combines the graphical user interface with a different one or more of the digital video streams selected according to actions of the user interacting with the graphical user interface provided by the VUI; and the one or more servers are further configured to release the resources allocated for the VSTB and VUI when the user session is complete.

2. The hospitality media system of claim 1, wherein the VUI and the VSTB are instantiated on different servers.

3. The hospitality media system of claim 1, wherein the one or more servers comprise one or more transcoding servers configured to receive at least some of the digital video streams and provide transcoded versions of the digital video streams to the VSTBs.

4. The hospitality media system of claim 3, wherein the display devices include a heterogeneous mix of target devices and the transcoding servers pre-process the digital video streams by suitably pre-shaping content in order to support the heterogeneous mix of target devices.

5. The hospitality media system of claim 1, wherein the one or more servers are further configured to transmit the single media stream to the display device via a particular Quadrature Amplitude Modulation (QAM) channel on a coaxial cable infrastructure and to remotely control the display device to tune to the particular QAM channel.

6. The hospitality media system of claim 1, wherein the display devices correspond to any of a television, a desktop computer, a laptop computer, a notebook device, a tablet device, a handheld device, a netbook, or a smart phone.

7. The hospitality media system of claim 1, further comprising a display control unit coupled between the network and the display device; wherein the display control unit comprises a first interface configured to receive the single media stream from the one or more servers and a second interface configured to transmit the single media stream to the display device.

8. The hospitality media system of claim 7, wherein the control unit further comprises a third interface configured to interact with and control operation of the display device.

9. The hospitality media system of claim 1, wherein a number of the VSTBs running on the one or more servers at any time corresponds to a number of active display devices currently in use by users.

10. The hospitality media system of claim 1, wherein the VSTB is further configured to encrypt the single media stream for transmission across the network.

11. A method of providing video over a network in a hospitality media system, the method comprising:

transmitting a plurality of digital video streams on the network;

receiving an alert via the network upon a user activating a display device at a start of a user session; wherein the display device is one of a plurality of display devices located in guest rooms of a hospitality establishment, and the display devices cannot directly access and playback the digital video streams;

allocating resources in order to instantiate both a virtual set top box (VSTB) and a virtual user interface (VUI) for the display device in response to receiving the alert;

connecting by the VSTB to the VUI via a first virtual network computing (VNC) connection;

receiving by the VSTB via the first VNC connection graphical updates representing a graphical user interface as generated by the VUI;

combining by the VSTB the graphical user interface with one or more of the digital video streams available on the network;

transmitting the combined graphical user interface and the one or more video streams from the VSTB to the display device as a single media stream having a frame format and codec supported by the display device;

receiving user input and providing the user input to the VUI via a second VNC connection, at least some of the user input representing interaction of the user with a representation of the graphical user interface as shown on the display device;

sending updates of the graphical user interface as driven by the user input from the VUI to the VSTB via the first VNC connection;

changing video stream inputs to the VSTB such that the VSTB combines the graphical user interface with a different one or more of the digital video streams selected according to actions of the user interacting with the graphical user interface provided by the VUI; and releasing the resources allocated for the VSTB and VUI when the user session is complete.

12. The method of claim 11, further comprising instantiating the VUI and the VSTB on different servers.

13. The method of claim 11, further comprising receiving at least some of the digital video streams and providing transcoded versions of the digital video streams to the VSTBs.

14. The method of claim 13, wherein the display devices include a heterogeneous mix of target devices and the method further comprises pre-processing the digital video streams by suitably pre-shaping content in order to support the heterogeneous mix of target devices.

15. The method of claim 11, further comprising transmitting the single media stream to the display device via a particular Quadrature Amplitude Modulation (QAM) channel on a coaxial cable infrastructure and remotely controlling the display device to tune to the particular QAM channel.

16. The method of claim 11, wherein the display devices correspond to any of a television, a desktop computer, a laptop computer, a notebook device, a tablet device, a handheld device, a netbook, or a smart phone.

17. The method of claim 11, further comprising receiving the single media stream from the one or more servers at a first interface of a display control unit and transmitting the single media stream to the display device by a second interface of the display control unit.

18. The method of claim 17, wherein the control unit further comprises a third interface configured to interact with and control operation of the display device.

19. The method of claim 11, wherein a number of the VSTBs running on the one or more servers at any time corresponds to a number of active display devices currently in use by users.

20. The method of claim 11, further comprising encrypting the single media stream for transmission across the network.

21. A hospitality media system for providing video over a network, the system comprising one or more processors coupled to a memory storing instructions that when executed by the processors cause the one or more processors to:

receive an alert via the network upon a user activating a display device at a start of a user session; wherein the display device is one of a plurality of display devices located in guest rooms of a hospitality establishment, and the display devices cannot directly access and playback a plurality of digital video streams made available on the network;

allocate resources in order to instantiate both a virtual set top box (VSTB) and a virtual user interface (VUI) for the display device in response to receiving the alert;

connect the VSTB to the VUI via a first virtual network computing (VNC) connection;

receive by the VSTB graphical updates representing a graphical user interface as generated by the VUI via the first VNC connection;

combine by the VSTB the graphical user interface with one or more of the digital video streams available on the network;

transmit the combined graphical user interface and the one or more video streams from the VSTB to the display device as a single media stream having a frame format and codec supported by the display device;

receive user input and provide the user input to the VUI via a second VNC connection, at least some of the user input representing interaction of the user with a representation of the graphical user interface as shown on the display device;

send updates of the graphical user interface as driven by the user input from the VUI to the VSTB via the first VNC connection;

change video stream inputs to the VSTB such that the VSTB combines the graphical user interface with a different one or more of the digital video streams selected according to actions of the user interacting with the graphical user interface provided by the VUI; and release the resources allocated for the VSTB and VUI when the user session is complete.

22. The hospitality media system of claim 21, wherein the instructions further cause the one or more processors to instantiate the VUI and the VSTB on different servers.

23. The hospitality media system of claim 21, wherein the display devices include a heterogeneous mix of target devices and the instructions further cause the one or more processors to pre-process the digital video streams by suitably pre-shaping content in order to support the heterogeneous mix of target devices.

24. The hospitality media system of claim 21, wherein the instructions further cause the one or more processors to transmit the single media stream to the display device via a particular Quadrature Amplitude Modulation (QAM) channel on a coaxial cable infrastructure and remotely control the display device to tune to the particular QAM channel.

25. A non-transitory computer-readable medium comprising computer executable instructions that when executed by one or more computer servers cause the one or more computer servers to:

receive an alert via a network of a hospitality media system upon a user activating a display device at a start of a user session, wherein the display device is one of a plurality of display devices located in guest rooms of a hospitality establishment, and the display devices cannot directly access and playback a plurality of digital video streams made available on the network;

allocate resources in order to instantiate both a virtual set top box (VSTB) and a virtual user interface (VUI) for the display device in response to receiving the alert;

connect the VSTB to the VUI via a first virtual network computing (VNC) connection;

receive at the VSTB graphical updates representing a graphical user interface as generated by the VUI via the first VNC connection;

combine by the VSTB the graphical user interface with one or more of the digital video streams available on the network;

transmit the combined graphical user interface and one or more video streams from the VSTB to the display device as a single media stream having a frame format and codec supported by the display device;

receive user input and provide the user input to the VUI via a second VNC connection, at least some of the user input representing interaction of the user with a representation of the graphical user interface as shown on the display device;

send updates of the graphical user interface as driven by the user input from the VUI to the VSTB via the first VNC connection;

change video stream inputs to the VSTB such that the VSTB combines the graphical user interface with a different one or more of the digital video streams selected according to actions of the user interacting with the graphical user interface provided by the VUI; and release the resources allocated for the VSTB and VUI when the user session is complete.

26. The non-transitory computer-readable medium of claim 25, wherein the instructions further cause the computer servers to instantiate the VUI and the VSTB on different servers.

27. The non-transitory computer-readable medium of claim 25, wherein the display devices include a heterogeneous mix of target devices and the instructions further cause the one or more computer servers to pre-process the digital video streams by suitably pre- shaping content in order to support the heterogeneous mix of target devices.

28. The non-transitory computer-readable medium of claim 25, wherein the instructions further cause the one or more computer servers to transmit the single media stream to the display device via a particular Quadrature Amplitude Modulation (QAM) channel on a coaxial cable infrastructure and remotely control the display device to tune to the particular QAM channel.

* * * * *